Sept. 5, 1933.   G. V. PLANTE   1,925,498
AUTOMATIC TUBE CUTTING MACHINE
Filed Feb. 11, 1931   8 Sheets-Sheet 1

Inventor
Gordon V. Plante
By Mason Fenwick Lawrence
Attorneys

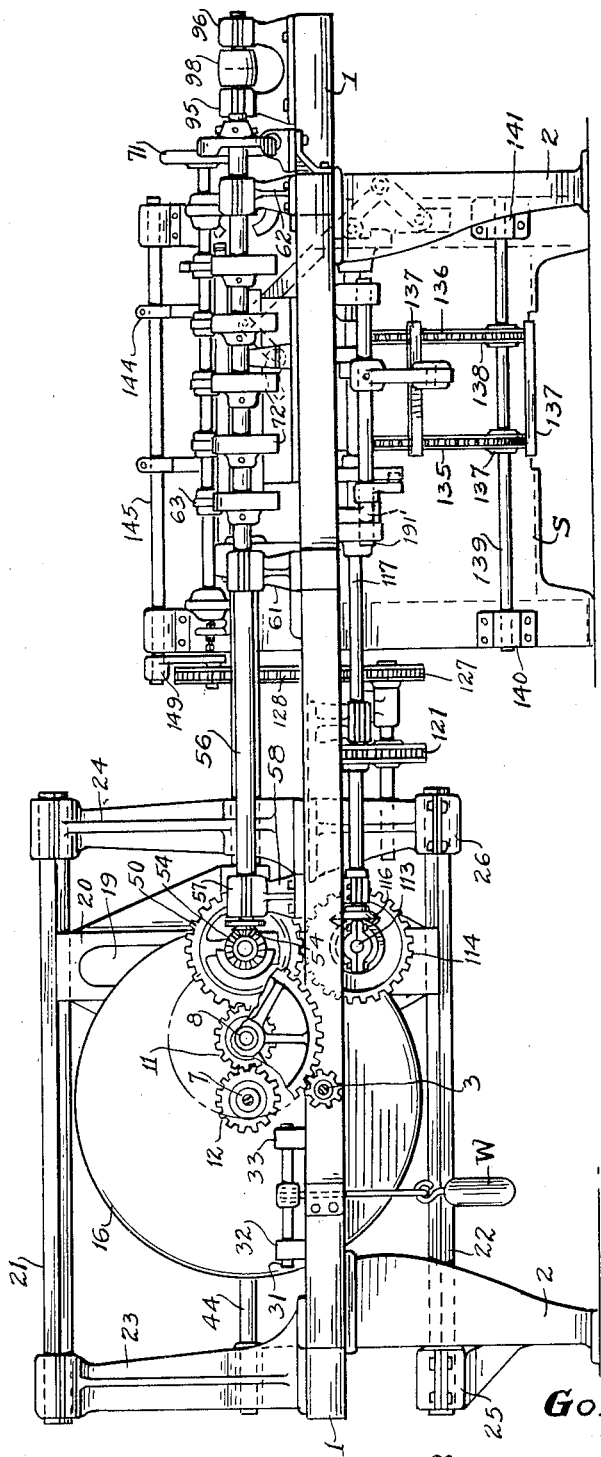

Sept. 5, 1933.  G. V. PLANTE  1,925,498
AUTOMATIC TUBE CUTTING MACHINE
Filed Feb. 11, 1931  8 Sheets-Sheet 3
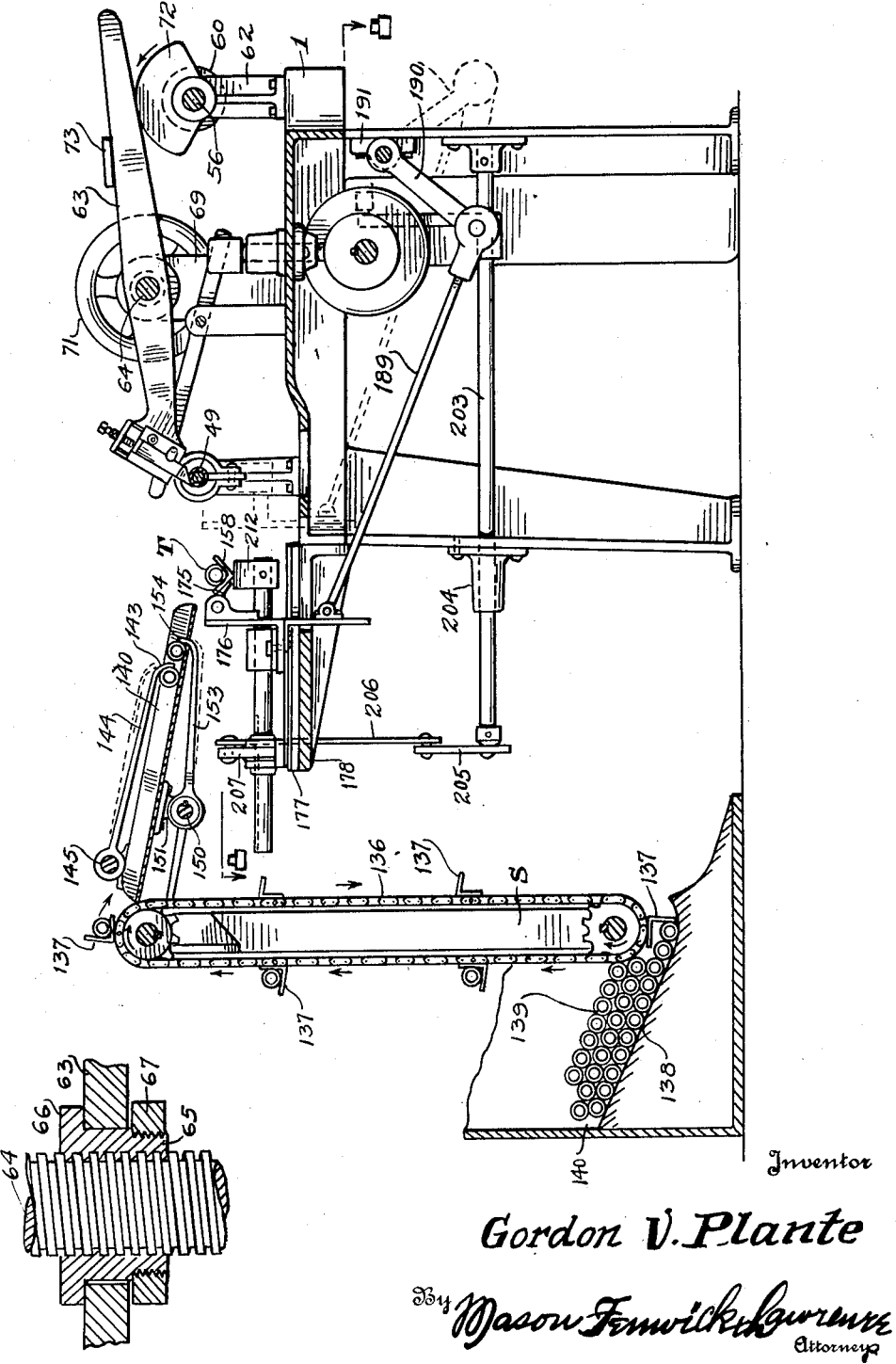
Inventor
Gordon V. Plante
By Mason Fenwick & Lawrence
Attorneys Sept. 5, 1933.　　　　G. V. PLANTE　　　　1,925,498
AUTOMATIC TUBE CUTTING MACHINE
Filed Feb. 11, 1931　　　8 Sheets-Sheet 4
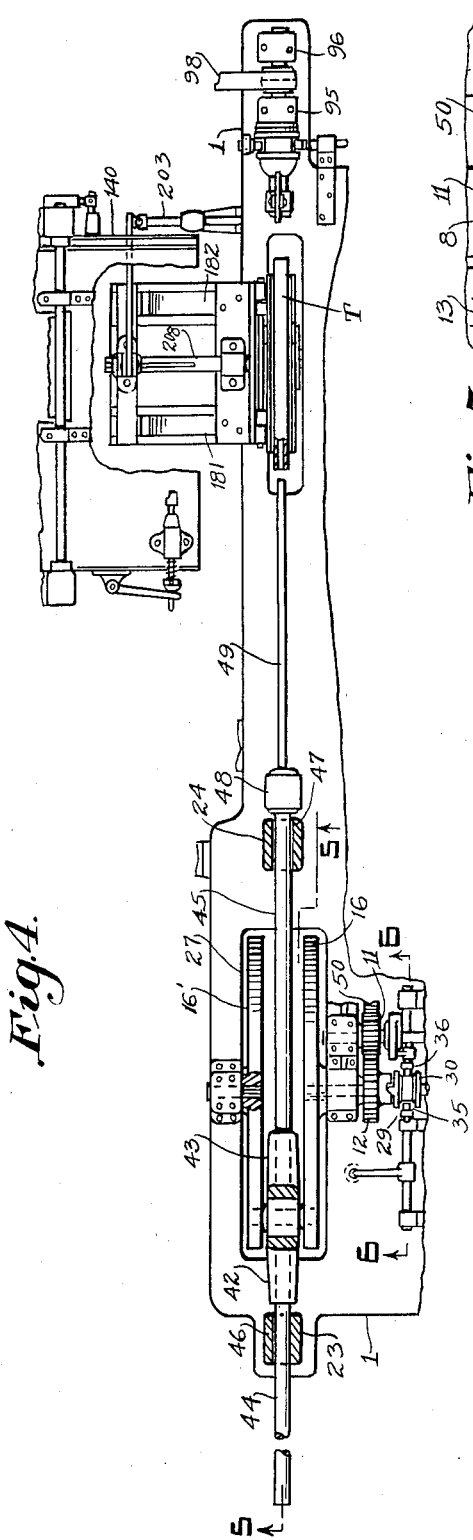
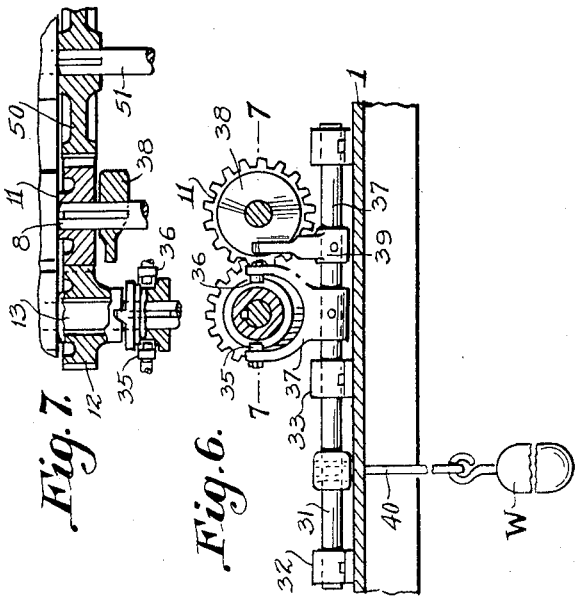
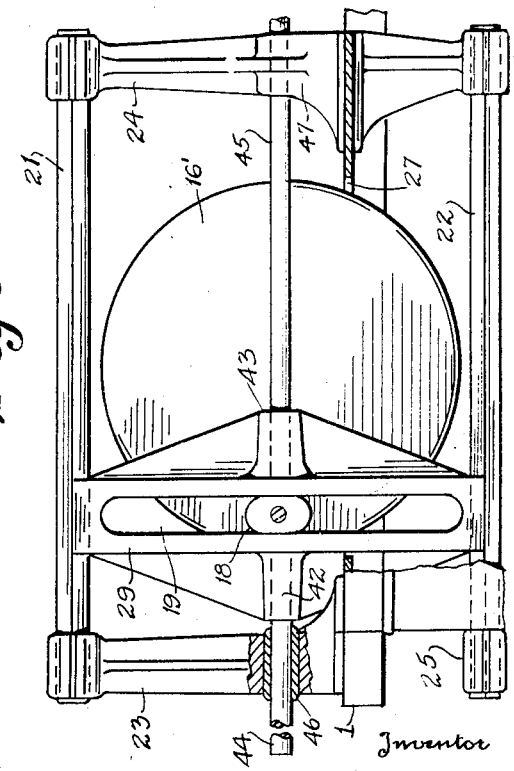
Inventor
Gordon V. Plante
By Mason Fenwick & Lawrence
Attorneys Sept. 5, 1933.     G. V. PLANTE     1,925,498
AUTOMATIC TUBE CUTTING MACHINE
Filed Feb. 11, 1931     8 Sheets-Sheet 5
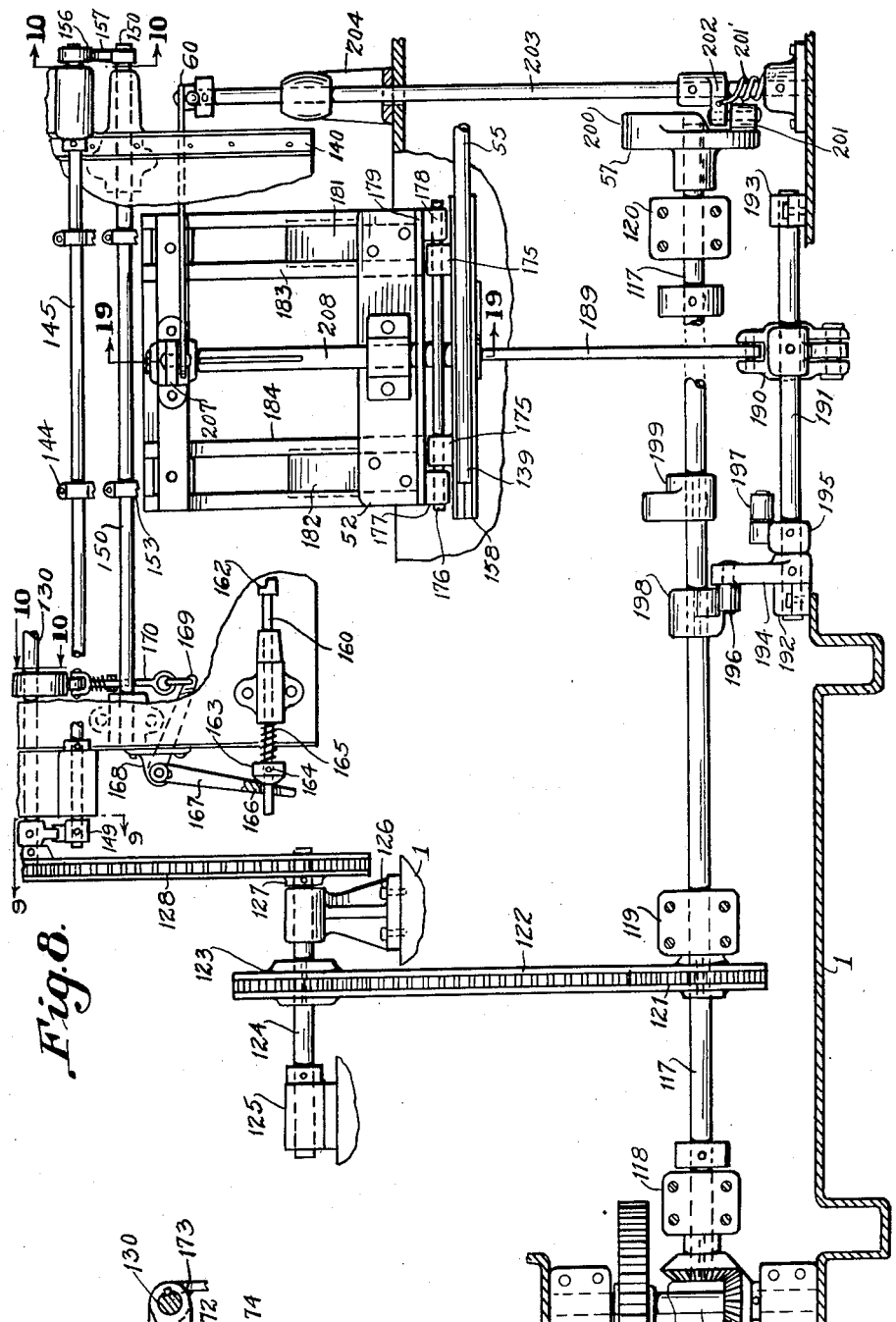
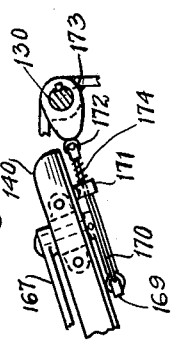
Inventor
Gordon V. Plante
By
Mason Fenwick Lawrence
Attorneys Sept. 5, 1933.  G. V. PLANTE  1,925,498
AUTOMATIC TUBE CUTTING MACHINE
Filed Feb. 11, 1931   8 Sheets-Sheet 6
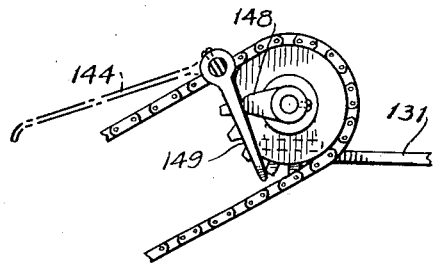
Fig.10ᵃ
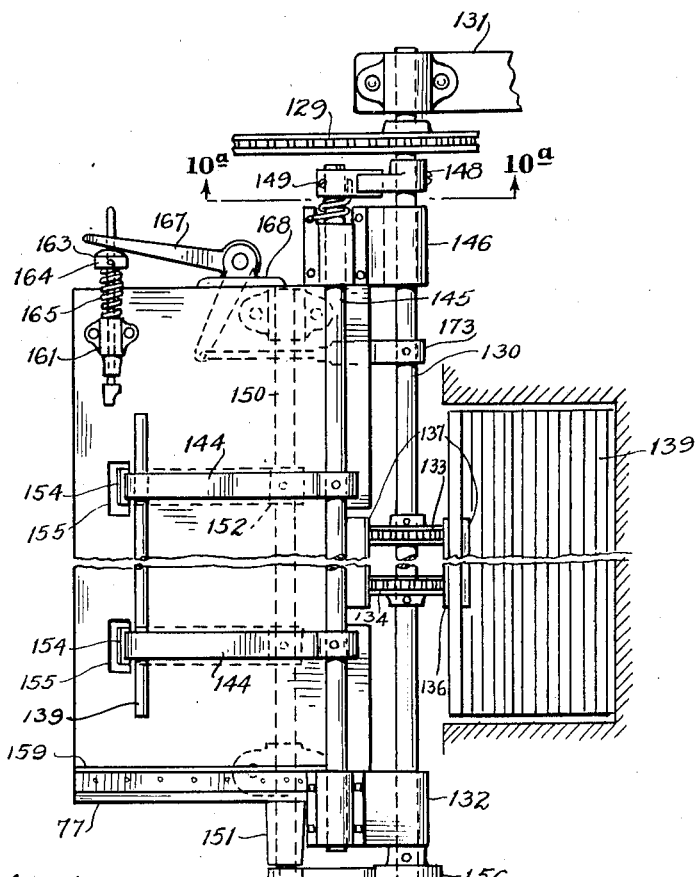
Fig.9.
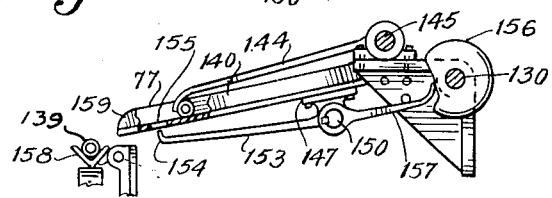
Fig.10.
Inventor
Gordon V. Plante
By Mason Fenwick & Lawrence
Attorneys Sept. 5, 1933.   G. V. PLANTE   1,925,498
AUTOMATIC TUBE CUTTING MACHINE
Filed Feb. 11, 1931   8 Sheets-Sheet 7
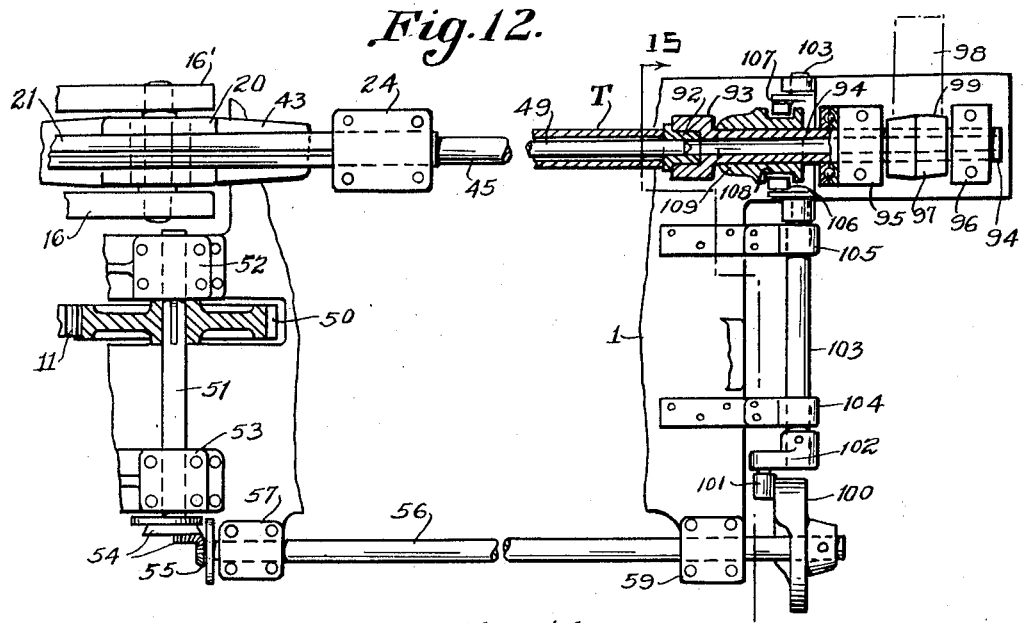
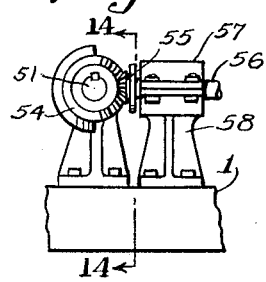
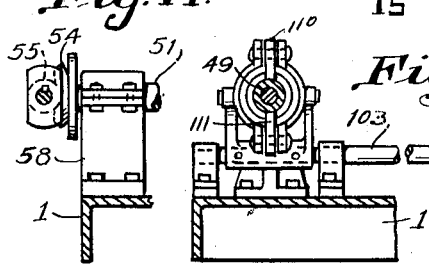
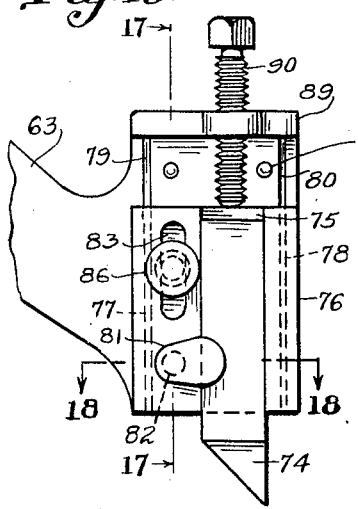
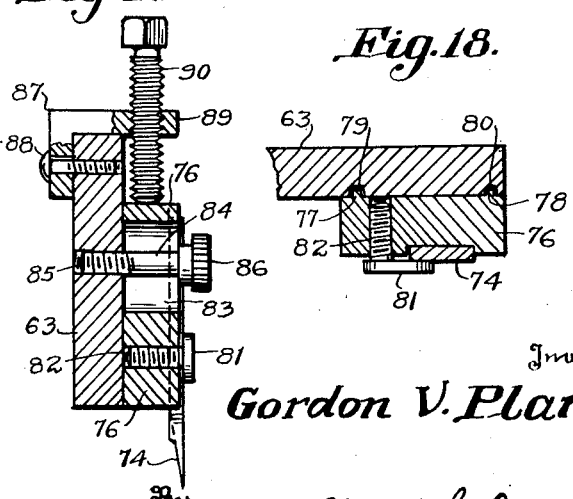
Inventor
Gordon V. Plante
By Mason Fenwick Lawrence
Attorneys Sept. 5, 1933.　　　　G. V. PLANTE　　　　1,925,498
AUTOMATIC TUBE CUTTING MACHINE
Filed Feb. 11, 1931　　　　8 Sheets-Sheet 8

Inventor
Gordon V. Plante
By Mason Fenwick Lawrence
Attorneys

Patented Sept. 5, 1933

1,925,498

UNITED STATES PATENT OFFICE 1,925,498

AUTOMATIC TUBE CUTTING MACHINE

Gordon Vivian Plante, Atlanta, Ga., assignor to National Paper Company, Atlanta, Ga.

Application February 11, 1931. Serial No. 515,112

6 Claims. (Cl. 164—69)

The invention forming the subject matter of this application is a machine for automatically severing sections of any desired predetermined lengths from long tubes of substantially the same length.

The main object of the invention is to provide a machine embodying a hopper adapted to receive a plurality of circular tubes, and to have these tubes automatically transferred, one at a time, from the said hopper to mechanism for dividing each tube into sections of predetermined lengths, and for delivering the said sections automatically from the machine.

Other objects of the invention will become apparent as detailed description thereof proceeds.

In the drawings:

Figure 2 is a side elevation of the machine;

Figure 3 is a vertical transverse section, taken on the line 3—3 of Figure 1;

Figure 4 is a plan of part of the said machine, illustrating several of the tube supporting elements in a different position from that illustrated in Figure 1;
Figure 5 is a sectional elevation, taken on the line 5—5 of Figure 4;

Figure 6 is a vertical transverse section, to an enlarged scale, taken on the line 6—6 of Figure 4;
Figure 7 is a horizontal section, taken on the line 7—7 of Figure 6;

Figure 8 is a fragmentary horizontal section, taken on line 8—8 of Figure 2;

Figure 9 is a fragmentary plan view of a tube conveyor mechanism, forming part of this invention;

Figure 10 is an end elevation of the parts shown in Figure 9;

Figure 10a is a section taken on the line 10a—10a of the Figure 9;

Figure 11 is a fragmentary detail of a plunger mechanism forming part of the invention;

Figure 12 is a broken plan of a part of the tube supporting mechanism forming part of the present invention, and of means for intermittently operating said mechanism;

Figure 13 is a fragmentary elevation of mutilated gearing operating the drive shaft mechanism for intermittently operating the tube supporting mechanism;

Figure 14 is a vertical section taken on the line 14—14 of Figure 13;

Figure 15 is a broken vertical transverse section taken on the line 15—15 of Figure 2;
Figure 16 is a fragmentary side elevation to an enlarged scale, of one of the tube cutter elements, illustrated in Figures 1 and 2;

Figure 17 is a vertical section, taken on the line 17—17 of Figure 16;

Figure 18 is a horizontal section, taken on the line 18—18 of Figure 16;

Figure 21 is a fragmentary detail, to an enlarged scale, illustrating the means for pivoting the knife levers to their supporting shaft.

Figure 1:
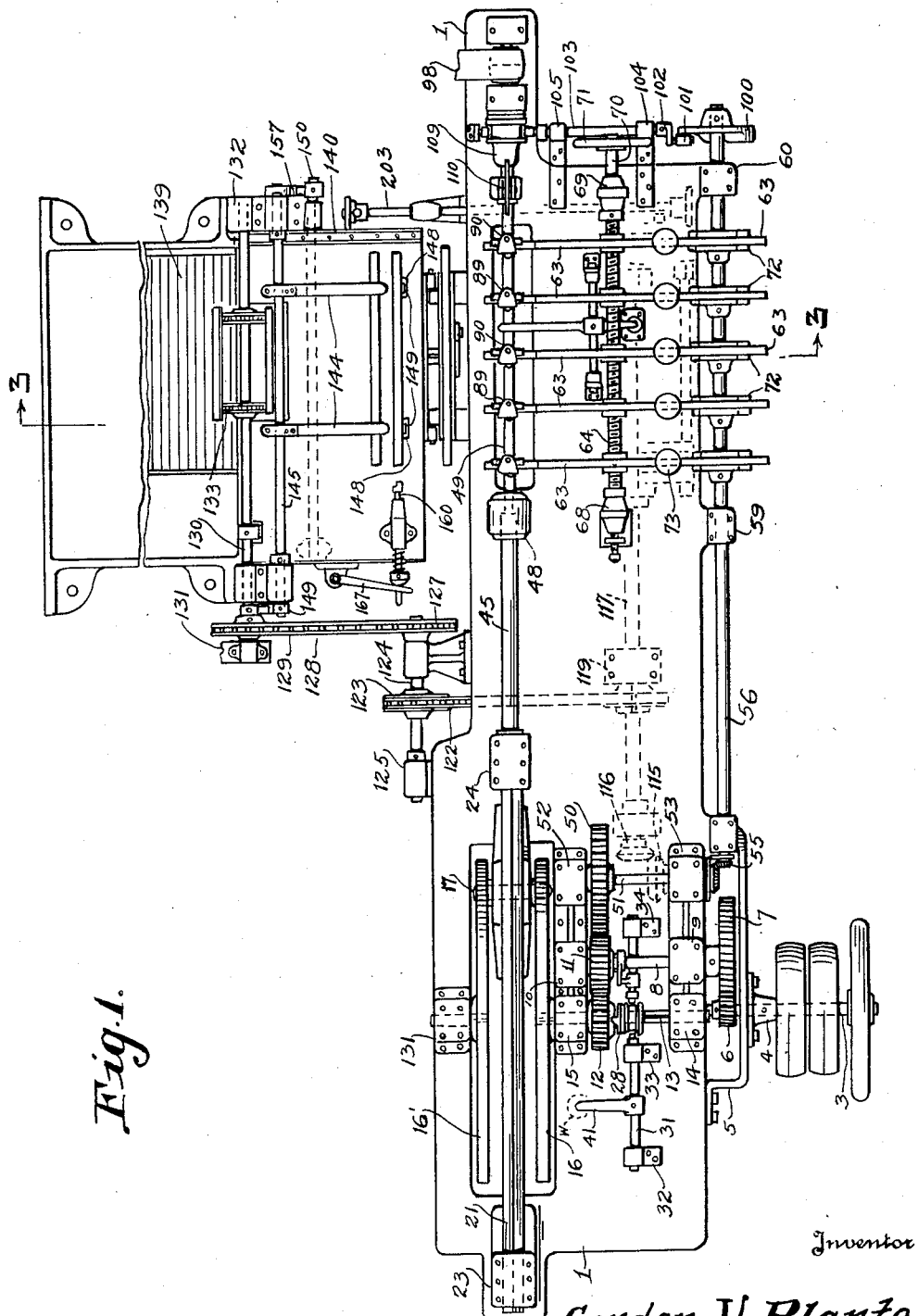
Figure 1 is a plan of the machine as a whole.
Figure 19:
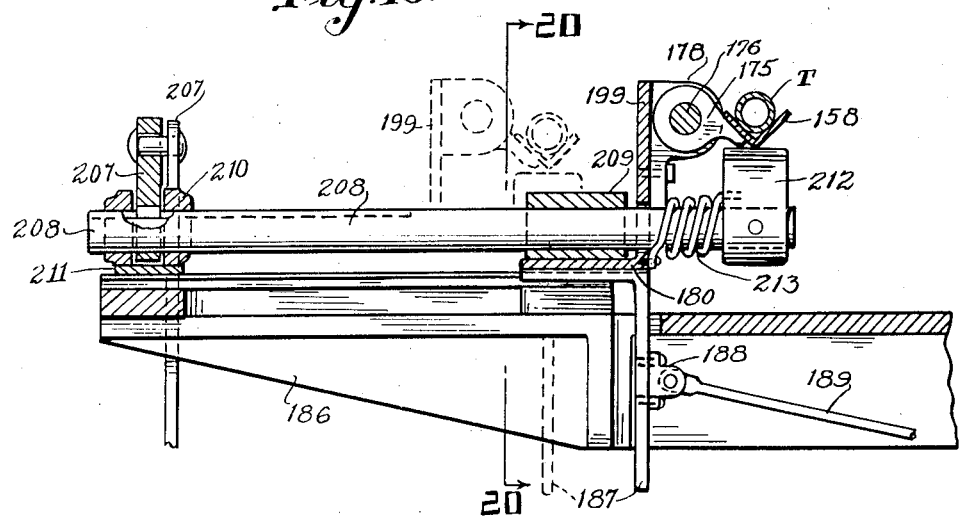
Figure 19 is a vertical section, taken on the line 19—19.
Figure 20:
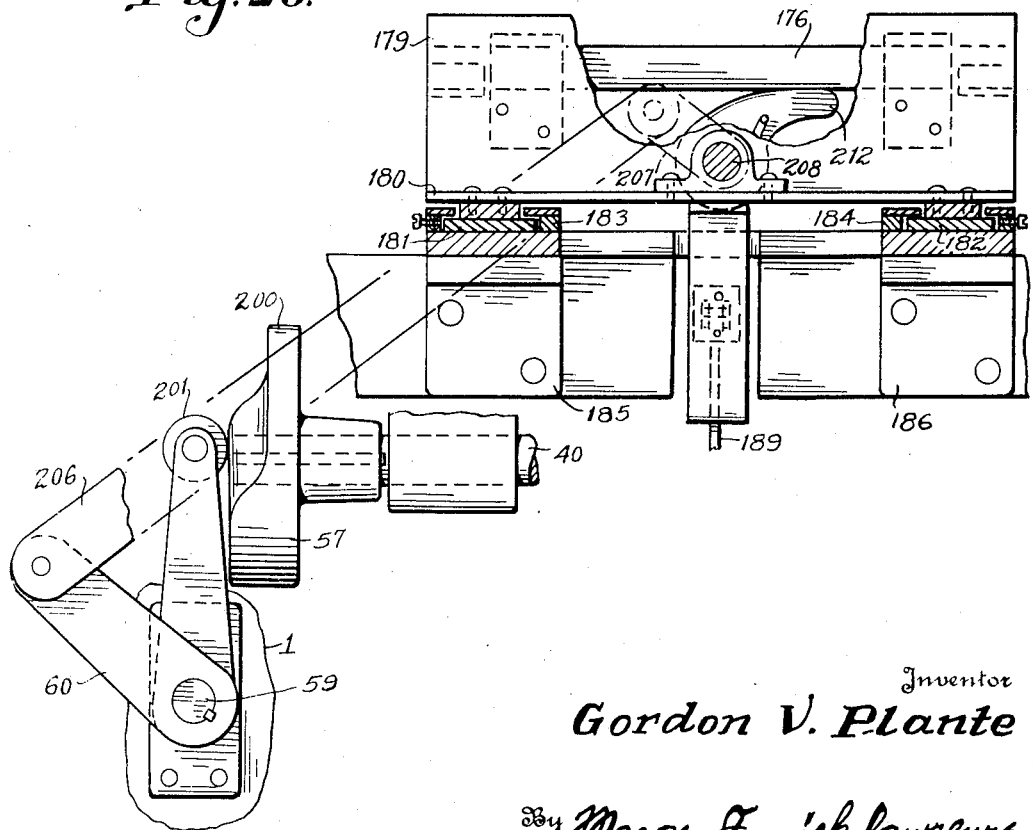
Figure 20 is a vertical transverse section, taken on the line 20—20 of Figure 19; and

As shown in the drawings, the invention comprises a base plate 1, supported at its opposite ends by suitable standard 2. A drive shaft 3 is journaled in a suitable bearing 4, secured to a bracket 5, bolted to the front edge of the base plate 1. The shaft 3, where it projects through the bearing 4 has a pinion 6 secured thereto in mesh with a large spur gear 7.

The gear 7 is fixed to one end of a shaft 8 which is journaled at its opposite end in bearings 9 and 10, mounted on the upper face of the base plate 1. The shaft 8 has a pinion 11 fixed thereto adjacent the bearing 10; and this pinion 11 meshes with a gear 12 rotatably mounted on a shaft 13, parallel to the shaft 8. The shaft 13 is journaled in bearings 14 and 15, secured to the upper face of base plate 1; and has a crank disc 16, secured to its rear end. A duplicate of this crank disc 16, designated by the numeral 16', is journaled in a short stub shaft 13' at the rear edge of the base plate 1. The shafts 13 and 13' are coaxial so that the two discs 16 and 16' rotate together, with the disc 16' acting merely as an idler and balancing disc.

The discs 16 and 16' are connected to each other by a crank pin 17, and this pin has a wear block or roller 18 pivotally mounted thereon (see Figure 5). The wear block 18 is mounted to reciprocate in a rectilinear slot 19, formed in a slide 20, which, at its opposite ends, is provided with V-shaped grooves fitting similarly shaped sides of guide rods 21 and 22. The rod 21 is fixed parallel to the base plate 1 in the upper ends of standards 23 and 24, (see Figures 2 and 5); and the rod 22 is fixed at its opposite ends, parallel to the rod 21, in a bracket 25 secured to the rear standard 2 at the left hand end of the machine, and to a bracket 26, depending from the lower face of the base plate 1. This arrangement forms a guide frame to control the reciprocation of the slide 20 in a slot 27 formed through the base plate 1.

As the various parts of this invention must be operated in timed relation, it is necessary to provide mechanism for intermittently reciprocating the said slide 20. To effect this intermittent movement, the gear 12 is provided with one element 28 of a clutch, the other element 29 of which is secured to a sleeve 30, keyed on the shaft 13. In order to remove the clutch element 29 intermittently into engagement with the element 28, a shaft 31 is journaled in bearings 32, 33 and 34, suitably secured to the upper face of base plate 1. The sleeve 30 has its periphery grooved to receive the tongues 35 and 36 projecting inwardly from the opposite furcations of a bifurcated lever 37, having its lower end fixed to the shaft 31 (see Figures 1, 4, 6 and 7).

In order to oscillate the lever 37 periodically, the shaft 8 has a cam 38 fixed thereto adjacent the gear 11 (see Figures 6 and 7); and this cam 38 engages the upper end of a lever 39 fixed to the shaft 31. The lever 39 is held in constant engagement with the face of the cam 38 by means of the weight W suspended by a cable 40 from the outer end of the lever 41 which has its other end suitably fixed to the shaft 31, a suitable aperture being formed in the base plate 1 for the passage of the cable 40 at the outer end of the lever 41.

The mechanism so far described takes care of the reciprocation of the slide 20 relative to the base plate 1; and this slide 20 (see Figures 4 and 5), is provided at its opposite sides with hubs 42 and 43 centrally bored to receive the cylindrical guide rods 44 and 45 respectively. The rods 44 and 45 are slidably mounted in cylindrical babbitted apertures 46 and 47, formed in the standards 23 and 24 respectively, the rod 45 being provided at its free end with a clutch 48 adapted to receive and hold rotatably one end of a cylindrical tube supporting spindle 49 (see Figures 1 and 4), the operation of which will be described in detail hereinafter.

The gear 11 also meshes with a large spur gear 50 secured to a shaft 51, journaled at its opposite ends in the bearings 52 and 53, supported by and secured to the upper face of base plate 1. The outer end of the shaft 51 is provided with a mutilated gear 54, meshing with a correspondingly mutilated gear 55, fixed to the end of a shaft 56, which is journaled at one end in a bearing 57 formed in a standard 58, on the upper face of the base plate 1 (see Figure 2). The shaft 56 extends parallel with the base plate 1 and is journaled in bearings 59 and 60, formed in standards 61 and 62 suitably secured to the upper face of the base plate 1. This shaft and mutilated gearing, intermittently operate a series of knife-levers mounted for oscillation toward and from the work at the right hand end of the machine as shown in Figure 1.

The knife supporting levers 63 are structurally similar; and, are mounted for oscillation toward and from the work, on a screw-threaded shaft 64. In order to locate each lever 63 in any desired position on the shaft 64, a nut 65 having a flange 66 is threaded on to the shaft 64, to be adjusted as desired on said shaft. The lever 63 is bored to slide over and rotate freely on the outer periphery of the nut 65 against the flange 66. Part of the nut 65 is externally screw-threaded to receive the disk nut 67, which, at its limit of inward movement on nut 65, just barely contacts with the side of lever 63. It will be obvious that each of these nuts may be moved to any desired position on the shaft 64 to form a smooth fulcrum on the shaft for the lever supported thereby.

The shaft 64 is journaled in standards 68 and 69 mounted on the upper face of base plate 1; and smooth part 70 thereof projects beyond the bearing 69 to receive the hand wheel 71. Rotation of the wheel 71 obviously causes a simultaneous adjustment of all the levers 63 lengthwise of the shaft 64 without disturbing the initial relative spacings of the nuts 65 on said shaft.

The levers 63 are spaced apart along the shafts 64 in accordance with the lengths of the sections desired to be severed from the long tube presented to the cutting knives. For this purpose, the lower edge of the rear arm of each lever 63 rests upon a cam 72 suitably secured in proper position, both angularly and longitudinally, on the shaft 56, which as previously stated, is intermittently rotated by the mutilated gearings 54 and 55. The levers 63 may be held constantly in contact with the cam 72 by means of springs or by weights 73 as shown in the drawings.

The end of the other arm of each lever 63 is provided with means to carry a cutter 74. As shown particularly in Figures 16, 17 and 18, the cutter 74 is slidably mounted in a groove 75 formed in a slide plate 76, having parallel tongues 77 and 78 projecting from the rear face thereof to seat in grooves 79 and 80 formed in one side of the outer end of the lever 63. It thus appears that the knife 74 may be adjusted lengthwise in the groove 75 of the plate 76, and that this plate 76 may be similarly adjusted on the end of the lever 63.

The cutter 74 is adapted to be clamped in position on the plate 76 by means of the clamping plate 81 and the screw 82, which passes through said plate 81, and is threaded into the plate 76. The plate 76 is provided with a slot 83 through which passes the shank 84 of a machine screw 85, screw-threaded into a tapered aperture formed in the end of lever 63, the said screw 85 being provided with a thumb piece 86 to provide for the ready clamping of the plate 76 to the end of lever 63.

In order to provide a positive stop for the cutter 74, a short piece of angle iron 87 is secured to the end of lever 63 by a machine screw 88. One flange 89 of the angle iron 87 projects laterally from the end of lever 63 and over the upper end of the plate 76 and knife 74. A stop screw 90 is threaded through the flange 89 and may be adjusted as desired to form a positive stop for the movements of plates 76 in one direction on the end of lever 63.

The tubing T intended to be presented to the knives for cutting operation is supported by spindle 49 (see Figure 12), which fits snugly within the tube. The spindle 49 varies in size with variations in the internal diameter of the tubes to be cut; and one end of the internal diameter of the tubes to be cut; and one end of this spindle is designed to be received and held rotatably by the chuck 48, while the other end is tapered to enter a bushing 92 positioned in the enlarged end 93 of a hollow shaft 94 which is journaled in bearings 95 and 96 supported by a projecting arm 97 of the base plate 1. The shaft 94 is rotated in said bearings by means of a belt 98, operating on a pulley 99, which is fixed to said shaft between the bearings 95 and 96. This shaft is continuously rotated by the said belt and pulley, or by any other suitable means, independently of the rotation or operation of the other parts of the machine.

During the cutting operation of the knife, it is necessary that the tubing be securely clamped or otherwise held on spindle 49. This clamping must be intermittent and take place only while the knives 74 are in operative posiiton. Accordingly, the shaft 56 which controls the oscillation of the knife levers 63, has its outer end provided with a cam 100 adapted to engage a roller 101 extending from a crank arm 102 which is fixed to one end of a shaft 103 journaled in brackets 104 and 105, projecting laterally from the end of the base plate 1, (see Figures 1, 12 and 15). The opposite end of the shaft 103 is provided with spaced apart crank arms 106 and 107, having rollers at their outer ends engaging a peripheral groove 108, formed in a bullnose cam 109 slidably mounted on the hollow shaft 94.

The bullnose cam 109 is in constant contact with the end of a plurality of gripping levers 110 and 111 fulcrumed on the enlarged end 93 of the shaft 94, as shown in Figure 3. The arms of the levers 110 and 111 adjacent the bullnose 109 are connected by a tension spring (not shown) which keeps the ends of said arms in contact with the curved part of the cam 109. The opposite ends of the levers 110 and 111 are adapted to be moved into gripping contact with the tube 49 by movement of the cam 109 between the ends of levers and 110 and 111, and against the tension of the said tension spring. It will be obvious that the cam 100 must be mounted on the shaft 56 in such relation as to cause gripping of the tubing T only when the knives are in their cutting positions.

Attention is particularly directed to Figure 3 on the drawings, which shows that the periphery of each cam 72 is eccentric with respect to the axis of the shaft 56. These cams are so designed as to bring the cutting knives quickly into contact with the tubing T and thereafter to increase the pressure of the cutting knives on the tubing as the knife approaches the spindle 91. This provides for a quick down thrust of the knives to the point where each knife just touches the tubing T, to be followed thereafter by a relatively slow and increasing cutting pressure. By this mode of operation, the knives are kept cool, tearing of the tubing is avoided, and a polish is given to the cut ends of the tube sections.

It will be obvious that in order to insure positive rotation of the tubing T until all sections are severed therefrom, it will be necessary to arrange the cams 72 on the shaft 56 so that the knife most remote from the bullnose cam 109 comes into contact with the tubing T slightly in advance of all the other knives; and so that each knife in the series of knives come into cutting contact with the tubing T slightly in advance of the knife adjacent thereto and toward the bullnose cam or gripped end of the tubing. By this arrangement the bullnose clutch is enabled to keep its grip on the tubing T as a unit. Obviously, if the knives all came into contact with the tubing at the same time, or if the knife nearest the clutch should cut through the tubing first, the tubing T would depend for rotation upon the friction between it and the spindle 91; and since this would not be sufficient to keep the tubing turning against the knives, failure to sever the tube completely into sections would result.

Each knife 74 is adjusted so that in operation it just barely cuts through the tubing, the knife edge lightly cutting the spindle 91 and being sharpened as required. If the spindle 91 should become unduly scored after repeated operation of the machine, the entire set of knife arms may be shifted to new position relative to the spindle 91 by rotation of the hand wheel 71.

In order to effect automatic feed of the tubes to be cut by this machine, a shaft 113 is journaled in suitable bearings suspended from the lower face of the base plate 1, and extends transversely of the base plate 1 parallel to the shaft 51. A large gear 114 is fixed to the shaft 113 and meshes with the gear 50 to impart rotation through the gear 114 to the shaft 113. A beveled gear 115 is fixed to the shaft 113 and meshes with a beveled gear 116, fixed to one end of a shaft 117 which extends lengthwise of the base plate 1 and is journaled in suitable bearing standards 118, 119 and 120, fixed to and depending from the lower face of the base plate 1 (see Figure 8).

A sprocket gear 121 is fixed on the shaft 117 and is connected by a sprocket chain 122 to a sprocket 123 which is fixed to a shaft 124 journaled in bearing brackets 125 and 126 secured to the rear edge of the base plate 1. A sprocket 127 is fixed to one end of the shaft 124 and is connected by a chain 128 to a sprocket 129 secured to one end of an elevator shaft 130 which is journaled at its opposite ends in bearings 131 and 132 formed at the upper end of a standard S extending from the floor supporting the machine to a necessary height above the base plate 1.

The shaft 130 between the bearings 131 and 132 is provided with a pair of sprocket wheels 133 and 134 in mesh with sprocket chains 135 and 136 (see Figure 2) which at the lower ends are connected operatively to the sprocket wheels 137 and 138 rigidly fixed to the shaft 139 journaled in the bearing brackets 140 and 141 secured to the standards above referred to.

The sprocket chains 135 and 136 have angle irons 137, suitably secured thereto and extending parallel with the base plate 1. These angle irons 137 are spaced apart at regular intervals on the chains 135 and 136, and are adapted, by rotation of said chains, to move across a hopper bed 138, extending at the rear of standard S and across the bottom of the sprocket gear mechanism, to engage and lift a long tube from a bundle of such tubes 139 lying in a hopper 140 and arranged in the path of movement of the angle irons 137 (see Figure 3).

The chains 135 and 136 and the angle irons 137 form an endless conveyor for moving the large tubes 139 from the bottom of the hopper to an elevated position immediately above the sprocket gears 133 and 134. Just as each angle iron 137 passes through its uppermost position it discharges a tube 139 on to an inclined table 140' fixed to the upper end of standard S and adapted to feed the tubes 139 toward a position whence they may be moved into another predetermined position for having a cutting operation performed thereon.

The inclined table 140' secured to the standard S or frame-work supporting the elevator mechanism is provided at its right hand edge, as seen in Figure 1, with a top flange 159 against which the tubes are adapted to be pushed by a resiliently mounted plunger 160 when each tube arrives at a position to be operated upon by the said plunger, as will be described hereinafter.

As a tube 139 rolls down the table 140' it comes in contact with downturned ends 143 of fingers 144 which are mounted on a shaft 145 to be rocked intermittently toward and from said table. The shaft 145 is journaled at its opposite ends on bearings 146 and 147, also formed on the upper end of standard S, and is rocked in said bearings by the engagement of a cam 148 (see Figure 9) on the shaft 130 with rocking lever 149 fixed to one end of shaft 145, where it projects through the bearing 146.

A second rock shaft 150 is journaled in bearings 151 and 152 secured to the lower face of table 140', and has a pair of fingers 153 provided with upturned ends 154 fixed thereto, the table 140' being provided with slots 155 to permit the ends 154 to move through the table into and out of the path of roll of the tubes 139. The rocking of the shaft 150 is effected by the engagement of a cam 156, fixed also to elevator shaft 130, with a lever 157 fixed to the end of shaft 150.

The fingers 144 and 153 are rocked in timed alternation by the cam mechanism just described to control the feeding of the tubes 139, one at a time to a V-shaped trough 158.

The table 140' is provided near the end adjacent the bullnose clutch with a flange 159 to form a stop for lining up one of the ends of the tubes 139 before feeding to the trough 158. In order to move each tube up against the flange 159, the table 140 has a plunger rod 160 mounted on a bracket 161 to slide against the end of a tube 139 when the latter is held momentarily between the ends 143 and 154 of the fingers 144 and 153.

The plunger rod 160 has an enlarged head 162 fixed to one end, and has a sleeve 163 held in adjusted position thereon by means of a set screw 164, a coil spring 165 being interposed between the bracket 161 and sleeve 162 to hold the head 162 normally retracted in bracket 161.

The rod 160 passes through an aperture 166 in a lever 167 which is held in contact with sleeve 163 to move rod 160 toward a tube 139. The lever 167 forms one arm of a bellcrank provided at its elbow on a bracket 168 secured to one edge of the table 140. The end of the other arm 169 is pivoted to a link 170 slidably mounted in a basket 171, fixed to the bottom of table 140, and having a roller 172 at its free end held against a cam 173 fixed to shaft 130. A compression spring 174 coiled around link 170 between bracket 171 and roller 172 to hold the roller 172 against the cam 173, and, through the said link and bellcrank cause properly timed reciprocation of the plunger rod 160.

After delivery of a tube from the table 140 to the trough 158, it is necessary to move the trough bodily until the axis of the tube therein coincides with the axis of the tube supporting rod 49, in order that the tube supporting rod 49 may be pushed therethrough at the proper moment. Obviously, it is necessary that movements of the trough 158 be effected in timed relation to the reciprocation of the tube supporting rod 49.

The trough 158 is fixed to a bracket 175 pivoted to a shaft 176 journaled in bearings 177 and 178 which are suitably secured to a vertical flange 179 of an angle iron, the horizontal flange 180 of which, has its opposite end riveted or otherwise secured to slides 181 and 182. The slides 181 and 182 are of inverted T-shape and are mounted to slides in guides 183 and 184 respectively supported by brackets 185 and 186 extending from the rear edge of the base plate 1. (See Figures 3, 8, 19 and 20). A second angle iron is secured to the lower flange 180 and has a vertical flange 187 provided with a pivot bearing 188 to which is pivotally secured one end of a reach rod 189, having its other end pivotally connected to a link 190. The link 190 has its free end fixed to a shaft 191 journaled in bearing brackets 192 and 193, fixed to the inner edge of the base plate 1 (see Figures 2, 3 and 8). The shaft 191 is rocked in its bearings by means of levers 194 and 195 suitably secured to said shaft and having rollers 196 and 197 extending laterally to contact with cams 198 and 199 fixed to the shaft 119 in such manner that one cam controls the rocking of the shaft 191 in one direction while the other cam causes rocking of the shaft in the opposite direction. It will be obvious that the rotation of the shaft 117 is intended to operate the cams 198 and 199 and the elements connected thereto in timed relation with the feeding of the tubes 139 into the trough 158 and to move the trough 158 from the position shown in Figure 3 to a position in which the axis of the tube coincides with the axis of the tube supporting rod 49 when the latter is in retracted position.

The cams are so arranged and designed that a tube 139 is held in the last named position until the supporting rod 49 is moved therethrough and into gripped contact with the finger element of a bullnose clutch at the right hand end of the machine as shown in Figure 1. As soon as the tube and supporting rod are properly secured to the bullnose clutch, the cams 72 oscillate the knife levers, to effect the cutting of the tubes. At the termination of the cutting operation the rod 49 is withdrawn and the tubes allowed to fall off to a conveyor or container beneath the machine. Before this happens, however, and as soon as the rod 49 is inserted in a tube, the trough 158 is lowered and the table moved back to its original position to receive another tube from the sloping table 140.

In order to effect the proper raising of the trough 158 to bring the tubes in position to be entered by the supporting rod 49, the following mechanism is used: A cam 200 is fixed to the end of the shaft 117 (see Figures 1, 3 and 8), to contact with a roller 201 mounted on the end of an arm 202, which is suitably secured to a shaft 203, extending across the end of the machine. The shaft 203 extends through a bearing bracket 204, fixed to the rear edge of the base plate 1. A link 205 is secured to the end of the shaft 203 and has its free end pivotally connected to an intermediate link 206 which has its other end pivotally connected to a short link 207. The link 207 (see Figure 19), is slidably and nonrotatably connected to a shaft 208 journaled in a bearing 209 secured to the horizontal flange 180, and also journaled in a split bearing 210 secured to a crossbar 211 connected to the slides 181 and 182.

The other end of the shaft 208 has a cam 212 secured thereto and a coil spring 213 has one end connected to said cam while the other end is secured to the vertical flange 179, in order to hold the said cam in normally raised position and tension the linkage just described. The operation of this linkage is roughly as follows: When the trough 158 is in tube-receiving position, it lies to the rear of and below the path of movement of the tube supporting rod 49. When the table is moved by the reach rod 189 to bring the axis of the tube below the axis of the rod 49, it is necessary to raise the trough 158 until the tube is in position to be entered by the supporting rod 49, and the cam 212 is designed to effect this necessary movement.

In operation, the long pieces 129 of tubing are fed one at a time from hopper 140, the endless conveyor and sloping table to the trough 158, which is intermittently moved from its receiving position below the table 140 to a position in which the supporting rod 49 is lined up with the tubing 139 in the trough 158. The rod 49 is then pushed through the tubing until it enters the bullnose clutch where it is gripped, along with the tubing, for rotation by said clutch.

As soon as the tubing 139 is gripped by the bullnose clutch, the trough 158 moves back to its receiving position under the end of the table 140. In the meantime, the knives start cutting the tubing into sections. The knives, as illustrated clearly on Figure 3, have a slicing as well as a direct radial cutting action. This is due to the angular mounting of the cutters which causes new cutting points to be presented as the knife cuts deeper into the tubing When the cutting operation is finished the rod 49 is withdrawn and the sections are removed therefrom, with the cycles of movement repeated indefinitely.

It will be readily understood that any springs or weights found necessary to keep the various cam levers in contact with their controlling cams will be supplied. Some of these springs have been omitted from the drawing, in order to facilitate disclosure, but any mechanic can supply them when necessary.

While I have shown a specific embodiment of the invention, it must be understood that this is for purpose of disclosure only, and must not be construed as imposing any limitations on the scope thereof.

What I claim is:

1. In a tube-cutting machine, a support, a screw-threaded fulcrum rod mounted on said support, a plurality of knife-supporting levers, means for adjusting each of said levers individually on said rod, and means for rotating said rod to adjust all of said levers simultaneously thereon.

2. In a tube-cutting machine, a support, a spindle, means for reciprocating said spindle rectilinearly on said support, a hopper having a plurality of tubes therein, means for automatically moving the tubes from said hopper, one at a time, from said hopper to a predetermined position relative to said support, said spindle moving into said tube when the latter is in said predetermined position, means to clamp said tube to the spindle when the knives are in contact with said tube, a plurality of knives mounted to oscillate on said support, and means to rotate said tube and spindle and move said knives into operative contact with said tube when the tube is in said predetermined position.

3. In a tube-cutting machine, a hopper having a plurality of tubes therein, a conveyor, a cutting mechanism, and means for operating said conveyor and cutting mechanism in timed relation for automatically cutting each of said tubes into sections of predetermined lengths.

4. In a tube-cutting machine, a hopper having a plurality of tubes therein, a conveyor, a cutting mechanism, means for operating for said conveyor and cutting mechanism in timed relation for automatically cutting each of said tubes into sections of predetermined lengths, and means for adjusting said mechanism to predetermine and vary the lengths of the sections to be cut from said tube.

5. In a tube-cutting machine, a support, means on said support adapted to receive and rotate a length of tubing to be cut into sections, a lever mounted to oscillate on said support and having a cutting knife adjustably mounted at one end thereof, and means on said lever for adjusting said knife in one direction transversely thereon.

6. In a tube-cutting machine, a support, means on said support adapted to receive and rotate a length of tubing to be cut into sections, a lever mounted to oscillate on said support and having a cutting knife adjustably mounted at the end thereof, means for adjusting said knife on said lever, and means for clamping the knife in adjusted position thereon.

GORDON VIVIAN PLANTE.